(12) United States Patent
Citriniti et al.

(10) Patent No.: US 10,902,381 B2
(45) Date of Patent: Jan. 26, 2021

(54) METHODS AND SYSTEMS FOR PROVIDING IMPROVED DATA ACCESS FRAMEWORK

(71) Applicant: GENERAL ELECTGRIC COMPANY, Schenectady, NY (US)

(72) Inventors: Thomas Dominic Citriniti, Niskayuna, NY (US); Kevin Edward Vecchione, Latham, NY (US)

(73) Assignee: General Electric Company, Schenectady, NY (US)

( * ) Notice: Subject to any disclaimer, the term of this patent is extended or adjusted under 35 U.S.C. 154(b) by 577 days.

(21) Appl. No.: 15/382,812

(22) Filed: Dec. 19, 2016

(65) Prior Publication Data
US 2018/0174057 A1 Jun. 21, 2018

(51) Int. Cl.
*G06Q 10/10* (2012.01)
*G06Q 10/08* (2012.01)
(Continued)

(52) U.S. Cl.
CPC ............. *G06Q 10/10* (2013.01); *G06F 16/00* (2019.01); *G06Q 10/04* (2013.01); *G06Q 10/087* (2013.01); *G06N 20/00* (2019.01)

(58) Field of Classification Search
CPC ...... G06Q 10/10; G06Q 10/04; G06Q 10/087; G06F 16/00; G06N 20/00
See application file for complete search history.

(56) References Cited

U.S. PATENT DOCUMENTS

| | | | |
|---|---|---|---|
| 4,727,533 A | 2/1988 | Erbert | |
| 7,243,158 B1 * | 7/2007 | Gutchigian | ........... G06F 16/258 709/236 |

(Continued)

FOREIGN PATENT DOCUMENTS

WO 2014058909 A2 4/2014

OTHER PUBLICATIONS

Harris et.al. , "The Lotus Data Lens approach to heterogeneous database connectivity", IEEE.com, pp. 174-178, http://ieeexplore.ieee.org/xpl/articleDetails.jsparnumber=153701&newsearch=true&queryText=datalens, Apr. 7-9, 1991.

(Continued)

*Primary Examiner* — Austin Hicks
(74) *Attorney, Agent, or Firm* — Buckley, Maschoff & Talwalkar LLC

(57) ABSTRACT

Some aspects are directed to systems for providing access to data. An example includes a computer system implementing a data access framework for providing data to one or more predictive models. The system is configured to receive at least one asset definition comprising an asset identifier for at least one asset associated with at least one data source, receive at least one data lens definition comprising a data lens identifier and a logical model identifier, the logical model identifier identifying at least one portion of a logical system model, access a first datastore to retrieve asset information extracted from the at least one data source, determine, using the logical model identifier, a portion of the logical system model associated with the retrieved asset information, format the retrieved asset information for storage in a second datastore corresponding to the logical system model, and store the formatted retrieved asset information in the second datastore.

20 Claims, 6 Drawing Sheets

(51) Int. Cl.
*G06F 16/00* (2019.01)
*G06Q 10/04* (2012.01)
*G06N 20/00* (2019.01)

(56) References Cited

U.S. PATENT DOCUMENTS

| | | |
|---|---|---|
| 8,886,622 B1 | 11/2014 | Parent et al. |
| 2009/0100025 A1 | 4/2009 | Binnie |
| 2017/0277641 A1* | 9/2017 | Tsunashima ........ G06F 12/1416 |
| 2018/0191867 A1* | 7/2018 | Siebel .................... H04L 67/02 |

OTHER PUBLICATIONS

"Data Lenses", Visualization et al, http://pmcruz.com/information-visualization/datalenses, pp. 1-3, Apr. 22, 2012.
Sarah, "A map is worth 1000 numbers with HERE Data Lens", HERE 360, http://360.here.com/2015/03/02/image-worth-1000-numbers-datalens/, pp. 1-10, Mar. 2, 2015.
Thom, "Data Lens: Powerful Insights for Your Data", Socrata, https://www.socrata.com/blog/introducing-data-lens/, pp. 1-5, May 5, 2015.
"Building Data Lenses Using CA API Gateway", CA.Com, http://www3.ca.com/us/~/media/Files/SolutionBriefs/building-data-lenses.pdf., pp. 1-3, at least before Jun. 16, 2016.

* cited by examiner

METHODS AND SYSTEMS FOR PROVIDING IMPROVED DATA ACCESS FRAMEWORK

BACKGROUND

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often considers both the physics of the task at hand, as well as the environment in which such assets are configured to operate.

Low-level software and hardware-based controllers have long been used to drive industrial assets. However, the rise of inexpensive cloud computing, increasing sensor capabilities, and decreasing sensor costs, as well as the proliferation of mobile technologies have created opportunities for creating novel industrial assets with improved sensing technology that are capable of transmitting data that can then be transmitted to a network.

By transmitting locally acquired sensor and environment data to a computing infrastructure, this data may be processed and analyzed to measure and predict the behavior of the underlying assets. Analytics can assist with determining the likelihood of particular outcomes based on sensor data received from the asset, past performance of the same or similar assets, predicted future performance of the same or similar assets, and the like.

However, current systems for providing sensor data to cloud computing environments require tight coupling between the underlying asset and the analytics utilizing data provided by those assets. Analytics operating in such a framework must be aware of the particular data storage structures used by each asset, which often requires understanding the schema of a large and disparate set of databases. This tight coupling between analytics and their sources of data requires substantial development to incorporate new analytics, assets, and/or data sources to the framework. As a result, systems developed under such a paradigm are typically unwieldy and tightly coupled to their particular asset installation.

It would therefore be desirable to provide systems and methods for implementing a data access framework that provides access to asset data in a manner that enables analytics to be portable and decoupled from the underlying asset data store.

SUMMARY

Some embodiments generally relate to methods and systems for providing improved access to datastores for analytics. Embodiments include computing hardware and software that implements data access layers that decouple analytics from underlying assets, providing direct improvements in computing performance and efficiency, while also simplifying the process of associating analytics to a particular asset or assets.

An embodiment provides a computer system implementing a data access framework for providing data to one or more predictive models. The system is configured to receive at least one asset definition comprising an asset identifier for at least one asset associated with at least one data source, receive at least one data lens definition comprising a data lens identifier and a logical model identifier, the logical model identifier identifying at least one portion of a logical system model, access a first datastore to retrieve asset information extracted from the at least one asset, determine, using the logical model identifier, a portion of the logical system model associated with the retrieved asset information, format the retrieved asset information for storage in a second datastore corresponding to the logical system model, and enable access to the formatted retrieved asset information via the second datastore.

The at least one asset definition may include an asset type, wherein the at least one data lens definition is a plurality of data lens definitions, and wherein one of the plurality of data lens definitions is selected for association with the at least one asset definition based at least in part on the asset type. The asset definition may include at least one address within the first datastore indicating the location of the asset information extracted from the at least one asset. The computer system may be further configured to initialize an extractor in response to receiving the at least one asset definition, wherein the extractor is configured to communicate with the asset to extract data from the at least one data source and store the extracted data in the first datastore. The extractor may be selected from a plurality of extractors based on the at least one asset definition. The computer system may be further configured to initialize a data lens in response to receiving the at least one data lens definition, and the data lens may provide an endpoint for accessing a portion of the logical system model corresponding to the logical model identifier. The data lens may provide access to only the portion of the logical system model corresponding to the logical model identifier. The data lens definition may include at least one access permission, and wherein access to the portion of the logical system model provided by the data lens is limited based on the at least one access permission. The initialized data lens may provide access to the portion of the logical system model to one or more predictive models. Enabling access to the formatted retrieved asset information may include caching the formatted retrieved asset information in a graph database queryable by a data lens associated with the data lens definition. Enabling access to the formatted retrieved asset information may include enabling a pass-through of the second datastore to the retrieved asset information stored in the first datastore in response to receiving a query at a data lens associated with the data lens definition.

Embodiments also provide a method for implementing a data access framework to provide data to one or more predictive models. The method includes receiving at least one asset definition comprising an asset identifier for at least one asset associated with at least one data source, receiving at least one data lens definition comprising a data lens identifier and a logical model identifier, the logical model identifier identifying at least one portion of a logical system model, accessing a first datastore to retrieve asset information extracted from the at least one asset, determining, using the logical model identifier, a portion of the logical system model associated with the retrieved asset information, formatting the retrieved asset information for storage in a second datastore corresponding to the logical system model, and enabling access to the formatted retrieved asset information via the second datastore.

In some embodiments, the at least one asset definition may include an asset type, wherein the at least one data lens definition is a plurality of data lens definitions, and one of the plurality of data lens definitions may be selected for association with the at least one asset definition based at least in part on the asset type. The asset definition may include at least one address within the first datastore indicating the location of the asset information extracted from the at least one asset. The method may include initializing an extractor in response to receiving the at least one asset definition and the extractor may be configured to communicate with the asset to extract data from the at least one data source and store the extracted data in the first datastore. The extractor may be selected from a plurality of extractors based on the at least one asset definition. The method may include initializing a data lens in response to receiving the at least one data lens definition, and the data lens may provide an endpoint for accessing a portion of the logical system model corresponding to the logical model identifier. The data lens may provide access to only the portion of the logical system model corresponding to the logical model identifier. The data lens definition may further include at least one access permission, and access to the portion of the logical system model may be provide by the data lens is limited based on the at least one access permission.

Embodiments also provide for a non-transitory computer readable storage medium comprising instructions that, when executed by a processor, configure the processor to receive at least one asset definition comprising an asset identifier for at least one asset associated with at least one data source, receive at least one data lens definition comprising a data lens identifier and a logical model identifier, the logical model identifier identifying at least one portion of a logical system model, access a first datastore to retrieve asset information extracted from the at least one asset, determine, using the logical model identifier, a portion of the logical system model associated with the retrieved asset information, format the retrieved asset information for storage in a second datastore corresponding to the logical system model, and enable access to the formatted retrieved asset information via the second datastore.

DETAILED DESCRIPTION

Overview and Definitions

Figure 1:
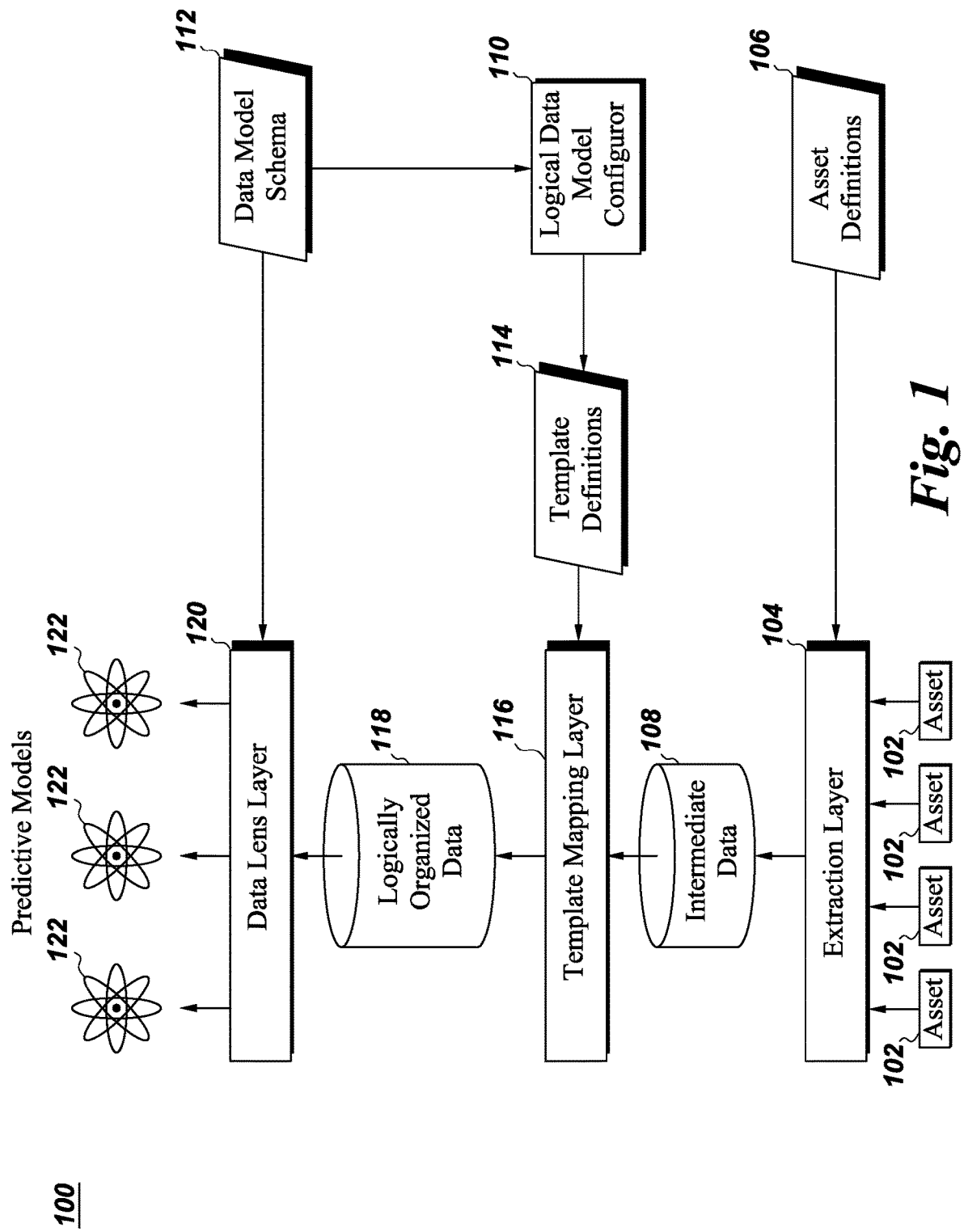
FIG. 1 depicts a system diagram of a data access framework in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

As advances in technology have led to the ability to retrieve accurate, real- or near real-time data from remotely located assets, systems have been developed to leverage this data to provide improved predictive and modeling capabilities for performance of those assets and similar assets. Asset management platforms (AMPs) such as the Predix™ platform offered by General Electric offer state-of-the-art cutting edge tools and cloud computing techniques that enable the incorporation of a manufacturer's asset knowledge with a set of development tools and best practices. Using such a system, a manufacturer of industrial assets can be uniquely situated to leverage its understanding of industrial assets themselves, models of such assets, and industrial operations or applications of such assets, to create new value for industrial customers through asset insights.

However, developing code to offer these benefits requires developers to understand the underlying asset hardware in fine detail to provide sensor data to a data storage location, to have a clear understanding of the data storage schema by which the sensor data is organized to extract data from assets to be sent to a predictive model, and to have an intimate understanding of data science and predictive modeling techniques to generate the predictive models that utilize the sensor data. The required intersection of these skillsets restricts the subset of users able to fully leverage access to AMPs and other predictive modeling platforms to a relatively small segment of the population. Furthermore, tight coupling between data extraction systems, data storage devices, and the predictive models accessing the data storage devices limits the portability and reusability of solutions created for a given asset installation.

Recognizing these difficulties and other technical challenges, the inventors have developed a data access framework that modularizes and abstracts the processes of extracting data from industrial assets, packaging that data into a logical form, and accessing that data by a predictive model from one another. This framework advantageously reduces coupling between these tasks, making individual components of the system portable across installations. The framework also streamlines the development process by eliminating the need for predictive model authors to understand the underlying sensor data storage schema. In this manner, embodiments advantageously provide a framework for analytics and predictive models to access data in an analytic-centric format, such that external analytics and predictive models define their data access requirements in terms of their needs, and the system automatically facilitates the process of identifying the underlying assets and data stores to meet those needs.

As used herein, the term "analytic" refers to computer code that, when executed, receives a set of input data and applies statistical or machine learning modeling techniques to that set of input data to determine an outcome. A particular category of analytic is that of "predictive models." The term "predictive model" should be understood to refer to analytics that result from training the analytic using a set of input data according to a particular statistical or machine learning technique to predict a future outcome based on the input data. As used herein, references to the process of "authoring" the predictive model should be understood to refer to process of selecting input data, features of the input data, measured outcomes, the desired analytical technique(s), whether the model is self-training, and other characteristics of the process by which the resulting analytic is generated and executes.

For the purposes of this disclosure, a predictive model that is paired to a particular industrial asset is referred to as a "digital twin" of that asset. A given digital twin may employ multiple predictive models associated with multiple components or subcomponents of the asset. In some scenarios, a digital twin of a particular asset may include multiple predictive models for predicting different behaviors or outcomes for that asset based on different sets of sensor data received from the asset or from other sources. A predictive model or set of predictive models associated with a particular industrial asset may be referred to as "twinned" to that asset.

A twinned asset may be either operating or non-operating. When non-operating, the digital twin may remain operational and its sensors may keep measuring their assigned parameters. In this way, a digital twin may still make accurate assessments and predictions even when the twinned physical system is altered or damaged in a non-operational state. Note that if the digital twin and its sensors were also non-operational, the digital twin might be unaware of significant events of interest.

A digital twin may be placed on a twinned physical system and run autonomously or globally with a connection to external resources using the Internet of Things (IoT) or other data services. Note that an instantiation of the digital twin's software could take place at multiple locations. A digital twin's software could reside near the asset and be used to help control the operation of the asset. Another location might be at a plant or farm level, where system level digital twin models may be used to help determine optimal operating conditions for a desired outcome, such as minimum fuel usage to achieve a desired power output of a power plant. In addition, a digital twin's software could reside in the cloud, implemented on a server remote from the asset. The advantages of such a location might include scalable computing resources to solve computationally intensive calculations required to converge a digital twin model producing an output vector $\bar{y}$.

It should be noted that multiple but different digital twin models for a specific asset, such as a gas turbine, could reside at all three of these types of locations. Each location might, for example, be able to gather different data, which may allow for better observation of the asset states and hence determination of the tuning parameters, $\bar{a}$, especially when the different digital twin models exchange information.

A "Per Asset" digital twin may be associated with a software model for a particular twinned physical system. The mathematical form of the model underlying similar assets may, according to some embodiments, be altered from like asset system to like asset system to match the particular configuration or mode of incorporation of each asset system. A Per Asset digital twin may comprise a model of the structural components, their physical functions, and/or their interactions. A Per Asset digital twin might receive sensor data from sensors that report on the health and stability of a system, environmental conditions, and/or the system's response and state in response to commands issued to the system. A Per Asset digital twin may also track and perform calculations associated with estimating a system's remaining useful life.

A Per Asset digital twin may comprise a mathematical representation or model along with a set of tuned parameters that describe the current state of the asset. This is often done with a kernel-model framework, where a kernel represents the baseline physics of operation or phenomenon of interest pertaining to the asset. The kernel has a general form of:

$$\bar{y}=f(\bar{a},\bar{x})$$

where a is a vector containing a set of model tuning parameters that are specific to the asset and its current state. Examples may include component efficiencies in different sections of an aircraft engine or gas turbine. The vector $\bar{x}$ contains the kernel inputs, such as operating conditions (fuel flow, altitude, ambient temperature, pressure, etc.). Finally, the vector $\bar{y}$ is the kernel outputs which could include sensor measurement estimates or asset states (part life damage states, etc.).

When a kernel is tuned to a specific asset, the vector $\bar{a}$ is determined, and the result is called the Per Asset digital twin model. The vector a will be different for each asset and will change over its operational life. The Component Dimensional Value table ("CDV") may record the vector $\bar{a}$. It may be advantageous to keep all computed vector $\bar{a}$'s versus time to then perform trending analyses or anomaly detection.

A Per Asset digital twin may be configured to function as a continually tuned digital twin, a digital twin that is continually updated as its twinned physical system is in operation, an economic operations digital twin used to create demonstrable business value, an adaptable digital twin that is designed to adapt to new scenarios and new system configurations and may be transferred to another system or class of systems, and/or one of a plurality of interacting digital twins that are scalable over an asset class and may be broadened to not only model a twinned physical system but also provide control over the asset.

In the context of the present application, embodiments advantageously provide a mechanism for such digital twins to define their data ingestion needs, and the described data access framework abstracts away the process of identifying relevant data storage locations and relevant assets. As such, embodiments provide an improved, streamlined mechanism for ingesting data for consumption by these digital twins.

As used herein, the term "data lens" should be understood to refer to a set of application software and data structures that define in hierarchical terms a set of required data for an external application, and the relationship of that set of required data to an underlying data set. Data lenses in this context may be defined so as not to include any information about how the data is stored logically within a logical model. Data lenses may be associated with a specific analytic need (e.g., a specific predictive model or analytic). As such, data lenses may be defined from the perspective of the analytic data requirements and agnostic to the underlying storage location of the data Overview of System Implementing Data Interface Framework FIG. 1 is a high-level architecture of a system 100 in accordance with some embodiments. The system 100 provides functionality that enables access to underlying data via predictive models in a modular manner. The system 100 advantageously provides for improved access to data by abstracting the extraction of underlying data, including sensor data, from the predictive model logic, such that the predictive model does not need to include subroutines for interacting directly with the original data sources. The system 100 further advantageously provides the capability to export and catalog data lenses and data extractors to enable the efficient reuse of those lenses and extractors in other systems and installations.

As illustrated in FIG. 1, one or more assets 102 communicate data to an extraction layer 104. The extraction layer 104 includes hardware and software configured to communicate with the assets 102 and to receive data from and pertaining to those assets to be stored as a set of intermediate data 108. To this end, the extraction layer 104 may include one or more extractors, which include applications, processes, threads, or the like that, upon execution, poll or otherwise receive data related to the assets 102 and to process that data into a form suitable for storage in the intermediate data. Such data may include, but is not limited to, data from sensors coupled to the assets, data located in various external datastores, data derived from predictive models and analytics associated with those assets, and the like. It should also be appreciated that while the instant illustration shows the extraction layer 104 as receiving data only from assets 102, in some embodiments the extraction layer 104 may also include extractors that receive data from other sources than the assets 102 themselves. For example, in some embodiments the extraction layer 104 may retrieve data from external databases, websites, archives, or the like.

The extraction layer 104 may be configured by a set of asset definitions 106. The asset definitions 106 include data that configures the extractors within the extraction layer 104 to communicate with the assets 102 or other data sources from which data is extracted. The asset definitions 106 may be, for example, JavaScript Object Notation (JSON) data, documents organized according to a markup language, or any other suitable file or data storage format. Receipt of an asset definition 106 for a particular asset 102 may cause the extraction layer to instantiate an extractor for that asset, such that the extraction layer 104 begins to extract data from that asset 102 in response to receiving the asset definition 106. A detailed example of an embodiment of an extraction layer is described further below with respect to FIG. 2.

As noted above, the data produced by the extraction layer 104 is stored in a set of intermediate data 108. The set of intermediate data 108 includes various databases, tables, memories, or the like for storing the various data extracted from the assets 102 and any other data sources. Data stored in this fashion may be indexed or otherwise addressed based on the asset or data source, such that processing or extracting meaningful data from the intermediate data 108 requires understanding of the underlying assets or data sources from which the intermediate data 108 was derived. As part of the extraction process, the particular extractor paired to each asset 102 may serve to tag extracted data with information related to the extractor and/or underlying asset to assist with accessing the intermediate data. The tags appended at the extraction layer 104 may be accessed by the template mapping layer 116 to identify appropriate information within the intermediate data 108 for inclusion in a set of logically organized data.

Embodiments include a template mapping layer 116. The template mapping layer 116 includes hardware and software configured to assist with interpretation of the intermediate data 108 and to assist with logical organization of the intermediate data 108 such that it is more readily consumable by one or more predictive models 122. To this end, the template mapping layer 116 is configured to identify particular data within the intermediate data 108, to extract that data, and to map that data to a logical model, represented as a set of logically organized data 118. To accomplish this, the template mapping layer 116 is configured by a set of template definitions 114 that define a set of addresses and/or rules for accessing data within the intermediate data that pertains to particular elements of the logical model. A detailed example of an embodiment of the template mapping layer 116 is described further below with respect to FIG. 3.

It should also be appreciated that, while the instant example illustrates a single datastore of intermediate data 108 for all of the illustrated assets, various embodiments may also provide for mapping of data from a plurality of datastores of intermediate data 108 to one or more sets of logically organized data 118. Such datastores may include intermediate data associated with disparate assets (e.g., some assets providing data to a first datastore, other assets to a second datastore), or different types of data being provided to different data stores (e.g., temperature values from a temperature sensor stored in a first set of intermediate data, pressure sensor readings stored in a different set of intermediate data). Through the use of a template mapping layer 116 that can access each of these disparate sets of intermediate data 108, the authors of predictive models 122 do not require an understanding of the underlying data storage mechanism in order to access the data they require.

The template definitions 114 may be generated by a logical data model configurator 110. The logical data model configurator 110 is an application or tool that receives a data model schema 112 and generates templates that map the data provided by assets to elements of the logical data model.

The data model schema 112 identifies the manner in which data is to be logically organized within the logically organized data 118. For example, the data model schema 112 may identify the particular logical sets of data to be associated with a particular asset or group of assets. As a specific example, a definition within the data model schema 112 may indicate that a value of "ambient temperature" should be defined for each asset with a type of "gas turbine." The data model schema 112 may be stored in any suitable format, including but not limited to the Resource Description Framework (RDF), or Web Ontology Language (OWL) formats.

The logical data model configurator 110 may include, for example, an Integrated Development Environment (IDE) or other Graphical User Interface (GUI) for identifying and/or defining assets, determining logical data elements, specifying data lenses, and the like. In this manner, templates defined by the logical data model configurator 110 serve to map the intermediate data 108 to the logically organized data 118 in a transparent manner.

It should also be appreciated that, in many scenarios, the underlying asset definitions 106 may be entirely hidden from a user or other source (e.g., an external system or application) of the data model schema 112 and vice-versa such that an author or external source of the asset definitions 106 does not require any visibility to the logical data model schema 112 and the author or external source of the logical data model schema 112 does not require any knowledge of which assets are present within the particular installation.

The intermediate data 108 is accessed by a template mapping layer 116 to populate the logically organized data 118 based on the template definitions. The logically organized data 118 is accessible to a data lens layer 120. The data lens layer 120 includes hardware and software configured to enable one or more predictive models 122 to access data stored within the logically organized data 118 using one or more data lenses. The data lenses provide endpoints that are accessible to the predictive models 122 such that the predictive models can call an API or otherwise access the endpoint to retrieve particular data stored within the logically organized data 118. In this manner, embodiments provide the ability for the predictive models 122 to retrieve data derived from and/or related to the underlying assets 102 without requiring a full understanding the manner in which the intermediate data 108 is stored or extracted from the assets 102. Embodiments further allow for the definition of data lenses that merge, combine, or otherwise process different elements of the logically organized data 118. For example, a given data lens implemented by the data lens layer 120 may ask for the average operating temperature across all compressors within a power plant. Instead of maintaining a separate running value stored within the logically organized data 118, the data lens may dynamically calculate the average temperature by accessing the current operating temperature of each compressor as stored within the logically organized data 118 at the time the data is requested by the predictive model.

As another example of the approach offered by embodiments of the data access framework, a fleet of aircraft engines owned and operated by different airlines may each feed data into one or more intermediate data sources, according to different formats. Extractors may be tailored to those particular engines and extract data in their own respective formats, and that data may be fed into one or more intermediate datastores. The template mapping layer may serve to map those disparate sources of engine data into a single logical model, represented by the set of logically organized data, which stores the relevant data for each engine according to a unified format suitable for querying by a suitably configured data lens.

It should be appreciated that the logically organized data 118 may represent a set of cached data that pertains to the defined data lenses, such as a graph database. Alternatively, the logically organized data 118 may act as a pass-through to the intermediate data, such that when a request is made to a data lens the logically organized data 118 causes the template mapping layer 116 to retrieve data from the intermediate data necessary to determine the values requested from the data lens.

The data lenses provided by the data lens layer 120 may be defined based on the data model schema 112 described above. The data lens layer 120 may access the schema to instantiate particular lenses associated with elements of the schema. In this manner, the data model schema 112 may notify the data lens layer 120 of the particular types of data that may be available within the logically organized data 118. The definitions of the respective data lenses instantiated by the data lens layer may be able to be queried in order to identify subsets of their respective data (e.g., a lens for aircraft engines may be able to be queried by engine model number). In this manner, the presence or lack thereof of a given asset is immaterial to the functioning the particular lens, such that adding a new asset for use with the data access framework does not require a reconfiguration of any associated data lenses. A detailed example of an embodiment of a data lens layer is described further below with respect to FIG. 4

Example of Embodiment of Extraction Layer

Figure 2:
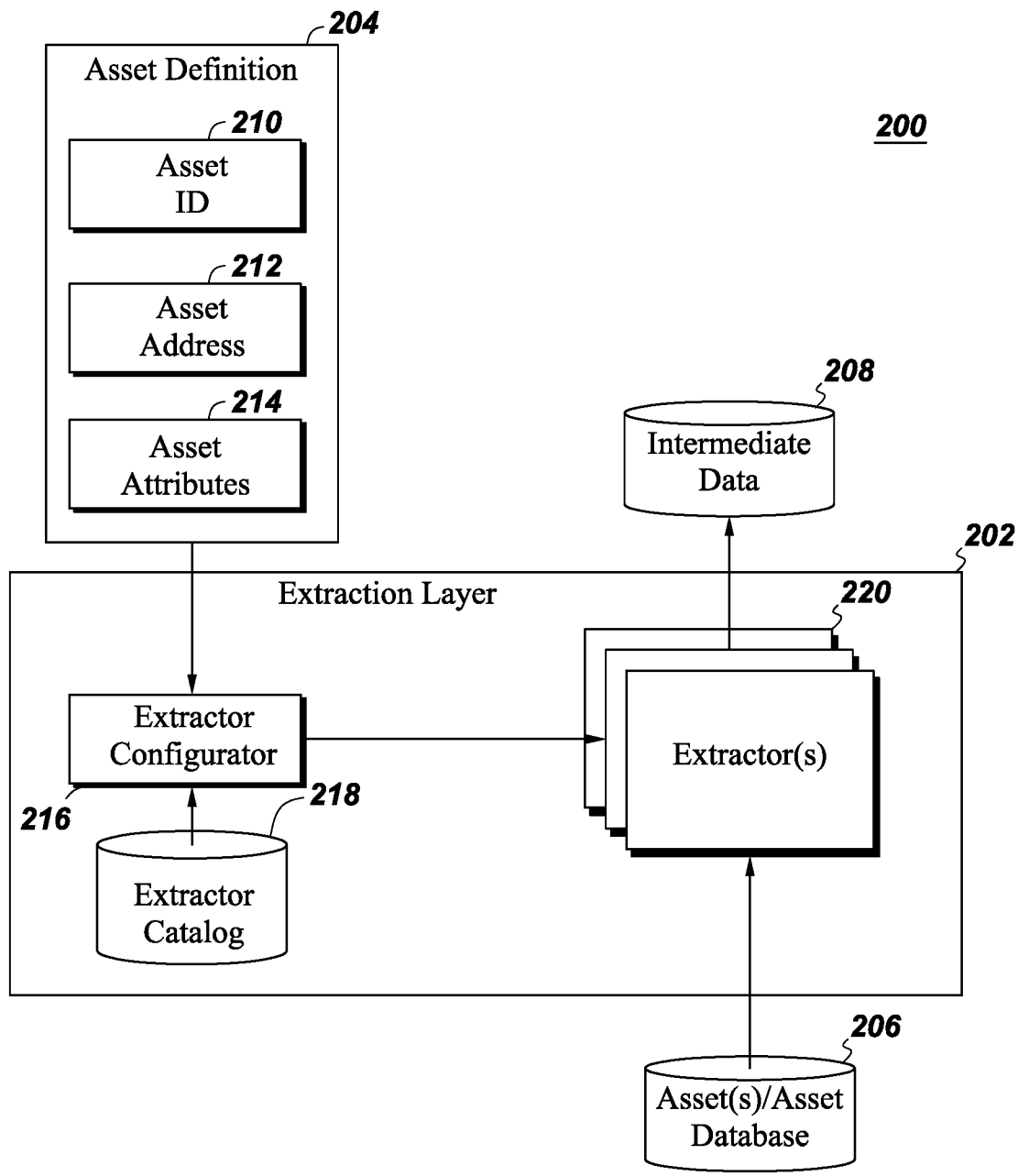
FIG. 2 depicts a data flow diagram of a data extraction layer of a data access framework in accordance with some embodiments.

FIG. 2 illustrates a detailed example of a data extraction data flow 200 for use in a data access framework in accordance with some embodiments. As described above with respect to FIG. 1, a data extraction layer 202 extracts data from one or more assets or asset datastores 206 through the use of one or more extractors 220. To configure the extractors 220, the extraction layer 202 receives one or more asset definitions 204. The asset definitions 204 may include an asset identifier 210, an asset address 212, and one or more asset attributes 214. The asset identifier 210 may be a unique identifier for the asset, such as a serial number. The asset address 212 may include a communications address such as an Internet Protocol (IP) address, a Medium Access Control (MAC) address, communications port, or other identification suitable to communicate with the asset. The asset attributes 214 may include various information about the asset, including but not limited to an asset type (e.g., aircraft engine, power turbine, medical imaging device, locomotive), an asset model number or identifier, an asset physical location (e.g., a plant or factory identifier), an asset group, an asset organization (e.g., a company name), a responsible user (e.g., a user account credential), or the like.

The asset definition 204 is provided to an extractor configurator 216. The extractor configurator 216 instantiates one or more extractors 220 to retrieve data from the asset specified by the asset definition 204. The extractor configurator 216 may select the appropriate extractor from an extractor catalog 218. The extractor catalog 218 includes a plurality of different types of extractors suitable for assets with various characteristics. For example, a certain type of extractor may exist for retrieving data from gas compressors, and another from an aircraft engine, or a first type of extractor may be associated with a particular model of aircraft engine and a second for a different model of aircraft engine. The extractor configurator 216 may analyze the asset attributes 214 to select an appropriate extractor 220 for instantiation. It should be appreciated that in some embodiments, each asset may have a separate paired extractor, such that a unique extractor exists for each asset. In other embodiments, assets may be grouped within a particular extractor. For example, instead of initializing a new extractor upon receiving the asset definition 204, the address of the asset may be added to a list of assets polled by an extractor that is already executing.

The extractor or extractors 220 access an asset or asset datastore 206 to retrieve data associated with those assets. The data retrieved by the extractor(s) 220 is stored in a set of intermediate data 208. The particular location within the intermediate data 208 at which the retrieved data is stored may be determined by the extractor configurator. In this manner, the extraction layer 202 retrieves data from the assets or associated asset datastores and causes the retrieved data to be stored in a set of intermediate data 208. An embodiment for accessing and processing this intermediate data 208 is described further below with respect to FIG. 3.

Example of Embodiment of Template Mapping Layer

Figure 3:
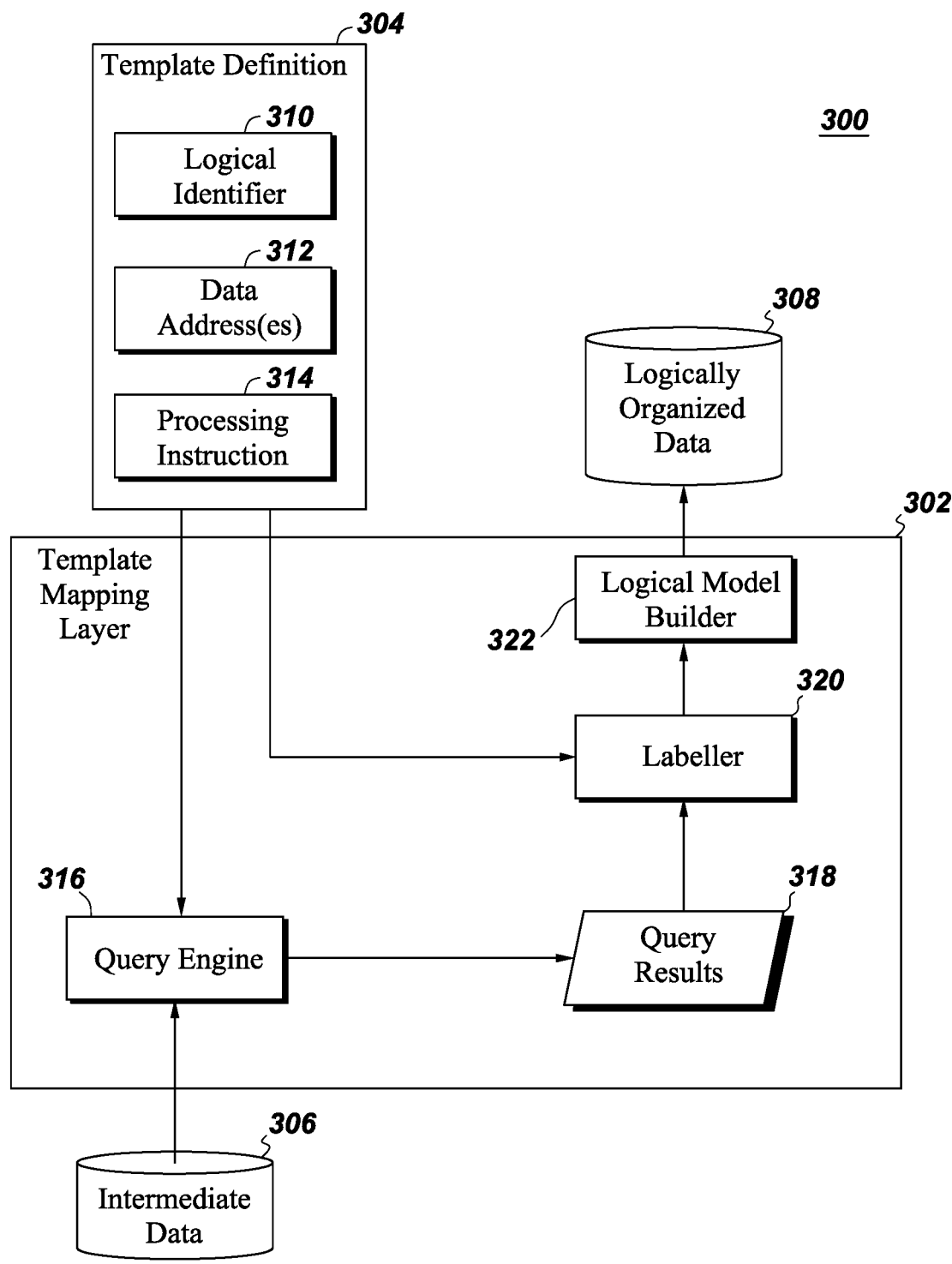
FIG. 3 depicts a data flow diagram of a template mapping layer of a data access framework in accordance with some embodiments.

FIG. 3 illustrates a detailed example of a template mapping data flow 300 for use in a data access framework in accordance with some embodiments. As described above with respect to FIG. 1, a template mapping layer 302 accesses a set of intermediate data 306 to generate a set of logically organized data 308. To accomplish this, the template mapping layer 302 receives one or more template definitions 304, such as from a logical data model configurator 110 as described with respect to FIG. 1. The template mapping layer 302 uses those definitions to control the process by which the intermediate data 306, which may be stored in an a device or installation specific format, is converted into the installation agnostic format of the set of logically organized data 308.

The template definition 304 may be used to inform the process by which relevant data is extracted from the intermediate data, and the process by which that extracted data is manipulated to generate the set of logically organized data 308. The template definition 304 may include a logical identifier 310, a data address or set of data addresses 312, and processing instructions 314.

The logical identifier 310 may indicate the address or tag to apply to the data created by the template within the logically organized data 308. For example, a given logical identifier 310 may indicate an asset name (e.g., "engine 1") and the attributes for that engine that are to be stored in the set of logically organized data 308 (e.g., "operating temperature", "revolutions per minute", "time in operation", and the like). The logical identifier 310 may be known by a different layer of the system. For example, the logical identifier 310 may be known to a data lens layer such that the data lens layer can use the logical identifier to query the logically organized data 308 for data generated by the template definition 304.

The data address or data addresses 312 may indicate the particular identifying information within the intermediate data 306 that represent the source data used to determine the set of logically organized data 308. For example, the data addresses 312 may identify particular tags, locations, or other identifiers that are associated with particular data to be transformed by the template into a format suitable for storage within the logical model.

The processing instruction 314 may include certain algorithms or data processing techniques to be applied to the raw data retrieved from the intermediate data in order to render the raw data into the appropriate format for inclusion in the logically organized data 308. For example, the processing instructions 314 may instruct the template mapping layer 302 to perform an average of certain retrieved values, to identify the maximum of different values, and to multiply the results together. The processing instructions 314 may thus define the process by which the retrieved portion of the intermediate data 306 is turned into a portion of the set of logically organized data 308.

The template mapping layer 302 may include a query engine 316 that generates a set of query results 318, a labeler component 320, and a logical model builder component 322. The query engine 316 may utilize the data addresses 312 indicated in the template definition 304 to query the associated portions of the intermediate data 306. The results of these queries are stored as query results 318.

The query results 318 are provided to a labeler 320, which determines which portion of the logical model that the results pertain to, such as a particular type of asset. The labeler 320 may determine this element of the logical model by consuming the logical identifier 310 included in the template definition and using that logical identifier to assist with categorization of the mapped data within the logical model. The labeler 320 may provide the query results 318 and any determined label to the logical model builder component 322. The logical model builder component 322 may utilize the processing instructions 314 to process the query results 318 and apply the appropriate label indicated by the labeler 320. As a result, a portion of the set of logically organized data is generated and used to construct the corresponding portion of the logically organized data 308. That set of logically organized data 308 may subsequently be accessed by a data lens layer using the same logical identifier 310 included within the template definition.

Example of Embodiment of Data Lens Layer

Figure 4:
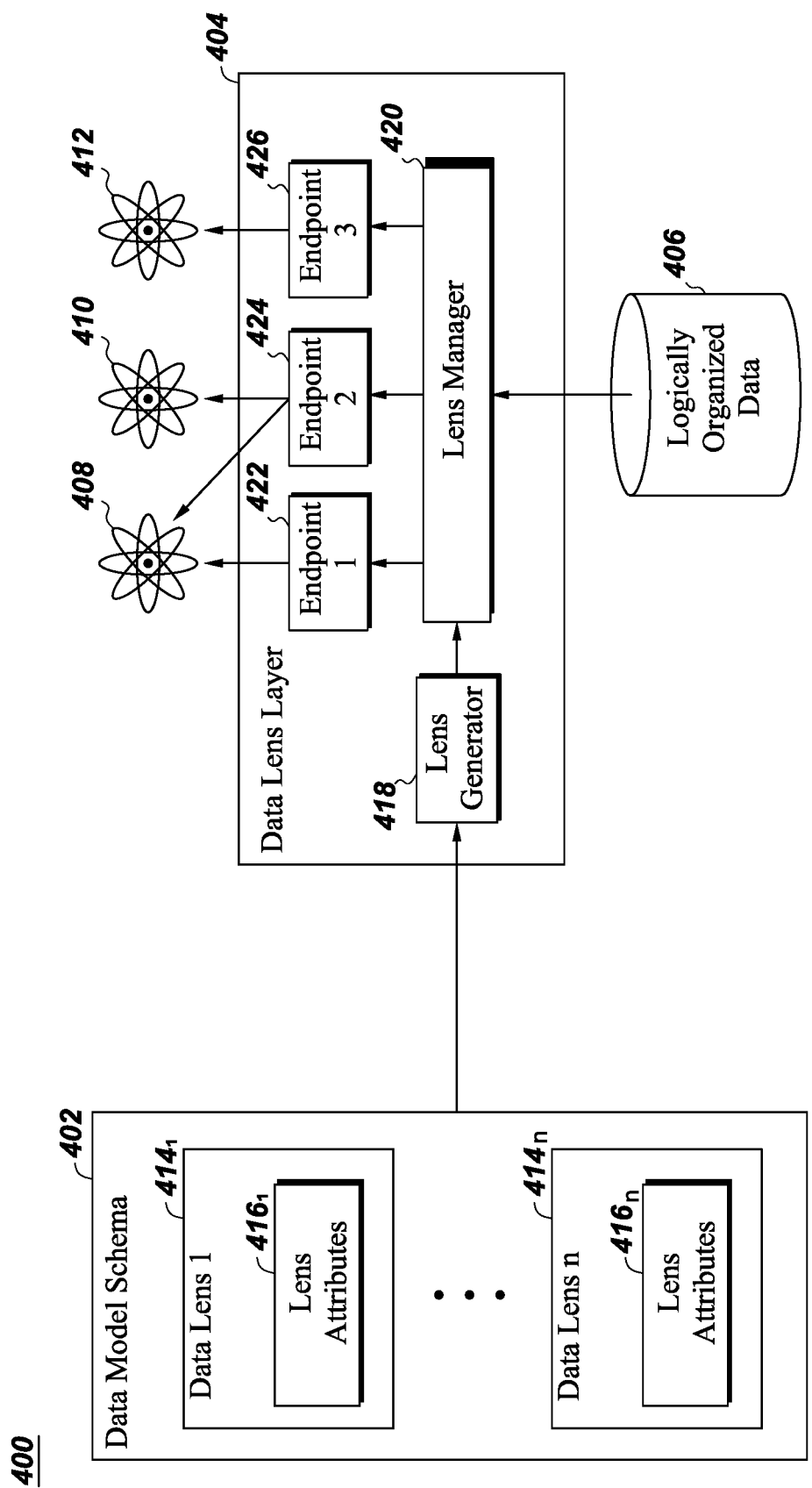
FIG. 4 depicts a data flow diagram of a data lens layer of a data access framework in accordance with some embodiments.

FIG. 4 illustrates a detailed example of a data lens data flow 400 for use in a data access framework in accordance with some embodiments. As described above with respect to FIG. 1, a data lens layer 404 provides a series of endpoints allowing access to a set of logically organized data 406. The data lens layer 404 receives a data model schema 402 that includes a set of data model definitions $414_1$-$414_n$. These data lens definitions 414 include respective sets of lens attributes 416. The data lens definitions 414 may include data that indicates the particular elements of the logically organized data 406 that they are intended to access, any rules and instructions for processing that accessed data, and the like. In some embodiments, the data lens definitions 414 and the attendant lens attributes 416 may also define access permissions (e.g., which predictive models 408 or other external components may access the lens), configuration parameters for the lens (e.g., whether the lens periodically updates from the logically organized data or updates on-demand, an update interval in the case of periodically updating lenses, a data freshness attribute for returned data, and the like). In some embodiments, the definition of individual lenses is employed to construct the logical model used to generate the schema for the set of logically organized data. In other words, the individual lenses, in aggregate, make up the whole of the logical model such that as new lenses are defined, the logical model is extended and expanded.

The data model schema 402 including these data lens definitions 414 is provided to a lens generator component 418 of the data lens layer 404. The lens generator component 418 communicates with a lens manager 420 to instantiate each defined lens. In this context, lens instantiation may include creating a new process thread for each data lens, enabling a preexisting polling thread to poll one or more elements of the logically organized data for each defined lens, opening communication ports for endpoints of the lens, and the like.

The lens manager 420 enables the functioning of the lenses caused to be generated by the lens generator 418. The lens manager 420 thus enables the lenses to access the logically organized data 406 to retrieve the portions of the logically organized data to which each lens pertains. In this regard, the lens manager 420 may monitor and manage a series of processes, applications, or microservices corresponding to the lenses or, in some embodiments, the lens manager 420 may function as the operating environment of the lenses themselves such that the lens manager 420 is configured by the defined lenses to access the logically organized data 406 directly. Each data lens 414 defined within the data model schema 402 may provide data to one or more endpoints 422-426. These endpoints 422-426 may be, for example, REST API endpoints that may be queried by a set of predictive models 408-412. These predictive models 408-412 may be aware of the particular data lens endpoints 408-412 that provide the data to be ingested by the predictive models 408-412, and the predictive models 408-412 are configured to query those endpoints accordingly.

The data lenses provided by the lens manager 420 may also accept query attributes along with a request for data. These query attributes may inform the process by which the data lens accesses the logical model to retrieve relevant information. For example, query attributes may specify a particular asset serial number, asset model type, data age, or the like, such that the results returned by that data lens have the requested attributes.

In this manner, the predictive models 408-412 consuming the data elements of the logically organized data only need to have knowledge of the particular endpoint that supplies their relevant data. As a result, the predictive models 408-412 are not directly coupled to the logically organized data 406 undergirding the data lenses, nor are the predictive models 408-412 coupled to the underlying intermediate data from which the logically organized data is derived. As a result, embodiments provide a decoupled system that can readily be used by the data scientists authoring the predictive models, the application developers exposing certain data via the data lens endpoints, and the database designers managing extraction of data from the underlying assets without requiring each user to fully understand the structure of the other systems.

Examples of Computing Hardware for Implementing a Data Access Framework

Figure 5:
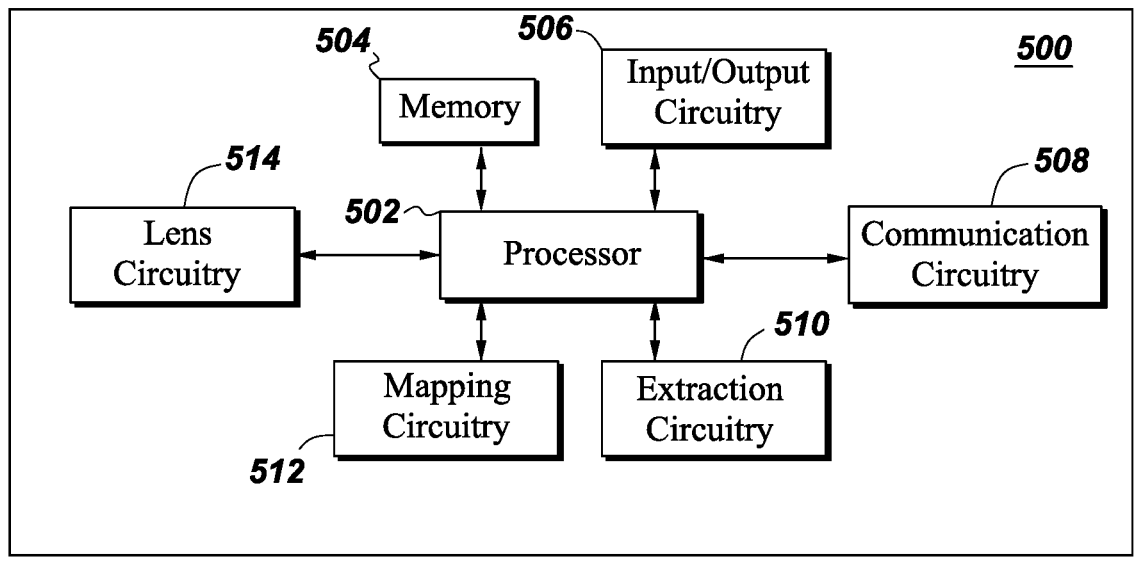
FIG. 5 depicts an example of hardware components of a computer system implementing a data access framework

The various components of the systems described in FIGS. 1-4 may be implemented by one or more computing nodes having specially programmed hardware and software. FIG. 5 illustrates an example of such hardware for implementing a data access framework as described above with respect to FIGS. 1-4. While the instant example 500 is described with respect to a computing node, it should be readily appreciated that embodiments may be implemented across multiple nodes, such that certain aspects of the system, certain data storage and access processes, and certain layers of the system are implemented across one or more disparate computing nodes. For example, a data layer that extracts data directly from assets and store that data as intermediate data may be implemented on a different node or nodes than a layer that constructs a logical model from that intermediate data, which may in turn be implemented on a different node or nodes from a layer that establishes endpoints for accessing the logical model.

The computing device 500 may be any computing device operable for implementing aspects of the system described above with respect to FIGS. 1-4. In this regard, the computing device may be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device. It should also be appreciated that, in some contexts, the computing device may comprise multiple such devices in a linked or networked architecture. For example, a graphical user interface may be provided by a "thin client" capable of execution on a mobile device, with server functions provided by a desktop or server computer. Such an implementation may allow for data lens definition and asset definition via the client with the actual compilation, linking, and/or execution of the underlying code to enable data access or extraction being performed by a server.

The computing device 500 of the illustrated example includes a processor 502. The processor 502 of the illustrated example is hardware, and may be implemented by one or more integrated circuits, logic circuits, microprocessors or controllers from any desired family or manufacturer. In the illustrated example, the processor 502 is structured in communication with a memory 504, input/output circuitry 506, communication circuitry 508, extraction circuitry 510, mapping circuitry 512, and/or lens circuitry 514.

Although the elements of the computing device 500 are described as discrete components, it should be appreciated that the components 502-514 may overlap in hardware and functionality. For example, elements of the extraction circuitry 510 may incorporate or overlap with elements of the processor 502, the communication circuitry 508, the memory 504, and the like. In some embodiments, the functionality of certain elements of the computing device 500 may be subsumed or covered completely by other elements of the device, such as in cases where an element of the computing device 500 is implemented via programmed hardware provided by another component of the computing device 500 (e.g., the processor 502 programmed by one or more algorithms stored in the memory 504).

The memory 504 may encompass any number of volatile and non-volatile storage devices, including but not limited to cache memory of the processor, system memory, mechanical or solid-state hard disk storage, network accessible storage (NAS) devices, redundant array of independent disk (RAID) arrays, or the like. Access to the memory 504 may be provided by one or more memory controllers implemented as hardware of the processor 502 and/or memory 504.

The computing device 500 also includes an input/output circuitry 506. The input/output circuitry 506 may be implemented by any type of interface standard, such as an Ethernet interface, a universal serial bus (USB), and/or a PCI express interface. The input/output circuitry 506 may provide for communication with one or more input devices that permit a user to enter data and commands to the computing device 500 and one or more output devices for enabling audible and visual components of a graphical user interface. For example, the input/output circuitry 506 may provide data interfaces for displaying an interface via a monitor and receiving inputs from a keyboard, mouse, touchscreen, or the like. The input/output circuitry 506 may enable a user to enter data and commands that are received by the processor 502 to perform various functions. As further examples, the input/output circuitry 506 may enable input via an audio sensor, a microphone, a camera (still or video), a keyboard, a button, a mouse, a touchscreen, a track-pad, a trackball, isopoint, a gesture input system, and/or a voice recognition system. Examples of output devices enabled by the input/output circuitry 506 include, but are not limited to display devices (e.g., a light emitting diode (LED), an organic light emitting diode (OLED), a liquid crystal display, a cathode ray tube display (CRT), a touchscreen, a tactile output device, a printer and/or speakers).

The communication circuitry 508 includes one or more communication devices such as a transmitter, a receiver, a transceiver, a modem and/or network interface card configured to facilitate exchange of data with external machines (e.g., computing devices of any kind, including but not limited to the various layers of the data access framework 100 described above with respect to FIG. 1) via a network (e.g., an Ethernet connection, a digital subscriber line (DSL), a telephone line, coaxial cable, a cellular telephone system, etc.).

The extraction circuitry 510 includes hardware configured to enable an extraction layer to interact with one or more assets or asset datastores and to extract data from those assets or asset datastores, such as described above with respect to FIGS. 1 and 2. The extraction circuitry 510 may communicate with those assets and asset datastores and enable the periodic retrieval of information for storage as a set of intermediate data. To this end, the extraction circuitry 510 executes various applications, microservices, processes, and/or algorithms via processing circuitry, such as the processor 502, to perform these and other tasks. The extraction circuitry 510 may also include hardware for communicating with those assets or asset datastores, such as provided by the communications circuitry 508.

The mapping circuitry 512 includes hardware configured to enable a template mapping layer to map a set of intermediate data to a logical model of a system, such as described above with respect to FIGS. 1 and 3. The mapping circuitry 512 may also implement a logical data model configurator 110 as described with respect to FIG. 1. To this end, the mapping circuitry 510 is configured to define a series of templates from a data model schema and a set of asset definitions, retrieve relevant data from a set of intermediate data, and process that relevant data to generate a logical model. The mapping circuitry 510 executes various applications, microservices, processes, and/or algorithms via processing circuitry, such as the processor 502, to perform these and other tasks. The mapping circuitry 512 may further include hardware for accessing and storing that data, such as the memory 504.

The lens circuitry 514 includes hardware configured to enable a data lens layer, such as the data lens layer described above with respect to FIGS. 1 and 4, to enable predictive models to access elements of a logical model using a set of endpoints. The lens circuitry 514 executes various applications, microservices, processes, and/or algorithms via processing circuitry, such as the processor 502, to perform these and other tasks. The lens circuitry 514 further includes hardware for providing data to one or more endpoints to be made accessible to predictive models and other external systems. This hardware may include storage hardware, such as the memory 504, and communications hardware, such as the communications circuitry 508, to enable these tasks.

Examples of Processes for Implementing a Data Access Framework

Figure 6:
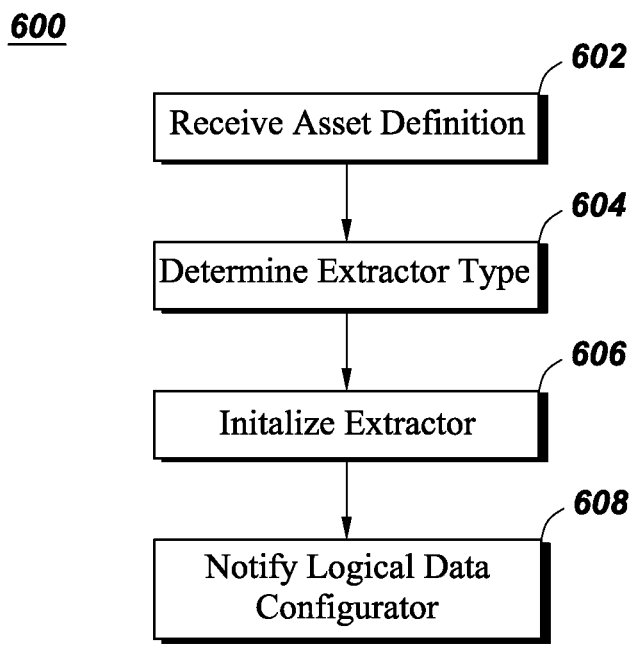
FIG. 6 depicts an example of a data extraction initialization process in accordance with some embodiments.

FIG. 6 illustrates an example of a process 600 for initializing extractors in a data access framework according to some example embodiments. The process 600 may be implemented by an extraction layer, such as described above with respect to FIGS. 1 and 2, utilizing hardware as described above with respect to FIG. 5. The process 600 illustrates a mechanism for receiving a set of asset definitions and enabling one or more extractors to extract data from and pertaining to the underlying assets associated with the asset definitions.

At action 602, the process 600 receives one or more asset definitions. As described above with respect to FIGS. 1 and 2, the asset definitions may include various elements of an asset suitable for initializing an extractor. These elements may include, but are not limited to, a unique asset identifier, an asset address, and various other asset metadata such as an asset type. At action 604, an extractor type is determined for the asset based on the contents of the asset metadata. For example, if the asset is an aircraft engine, an application suitable for extracting data from an aircraft engine may be selected. Extractors may have various additional configuration parameters defined based on the asset definition. For example, as described above, different subtypes of asset may be associated with different extractors. Additionally or alternatively, extractors may be configured to extract data from a particular address, extract data at periodic intervals, extract data in response to certain criteria (e.g., registering of a "shop visit" event for that asset from an asset service management system), and the like.

At action 606, the determined extractor is initialized according to the determination performed at action 604. Initialization of the extractor may cause the extractor to begin retrieving data and to store that data in an intermediate datastore as described with respect to FIGS. 1 and 2. Additionally or alternatively, in some embodiments, initialization of the extractor may cause the extractor to begin listening for the availability of such data, such as in the case where assets are not always available to have data extracted (e.g., where data is downloaded from the asset at certain times, such as when the asset is being maintained or otherwise offline).

At action 608, the process 600 alerts a logical data model configurator of the presence of the asset. This action enables the logical data model configurator to begin defining templates to access the data associated with the asset as will be described further below with respect to FIG. 7.

Figure 7:
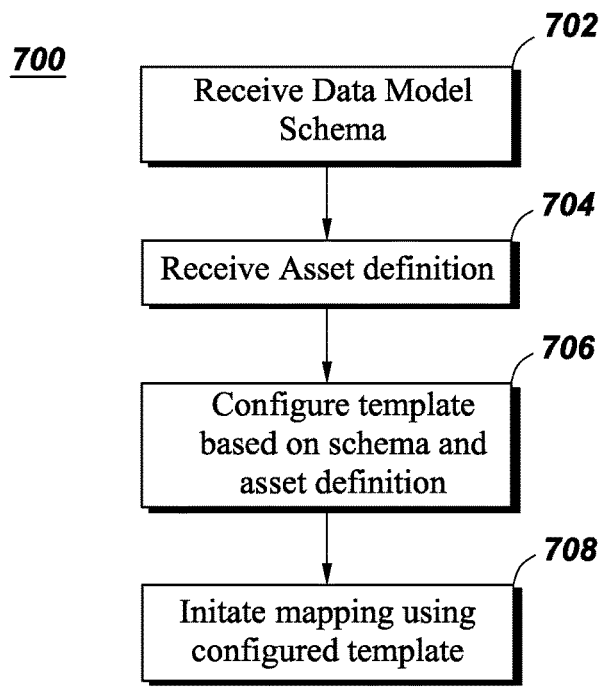
FIG. 7 depicts an example of a template mapping process in accordance with some embodiments.

FIG. 7 illustrates an example of a process 700 for mapping data between a set of intermediate data and a logical data model in accordance with some embodiments. The process 700 may be implemented, for example, by a template mapping layer as described above with respect to FIGS. 1 and 3, via computing hardware as described above with respect to FIG. 5. The process 700 illustrates a mechanism by which asset definitions and a data model schema are used to configure one or more templates for use by a template mapping layer to populate a logical data model. The process 700 provides a mechanism for dynamically enabling the creation of templates from the data model schema and the asset definitions such that a data lens layer and an extraction layer are decoupled from one another, improving the portability, scalability, and performance of both the underlying asset data extraction process and any predictive models and/or data lenses accessing a logical data model derived from the extracted data.

At action 702, the process 700 begins by receiving a data model schema. The data model schema defines the particular relevant data elements to be used for populating a logical data model. For example, the schema may indicate that assets of a particular type have certain sub-attributes and that certain sub-attributes are determined according to particular calculations. The data model schema may be received from an authoring tool, such as an IDE allowing for configuration of the data model, through ingesting a configuration file, or through various other techniques.

Each time an asset is instantiated having that particular asset type, a new entry or lens may be defined within the logical data model for that asset. The presence of a particular asset is indicated at action 704, where one or more asset definitions are received. These asset definitions, such as the asset definitions described above with respect to FIGS. 1 and 2, may include various asset attributes suitable for determining the relevant mapping between that asset type and elements of the logical data model. The asset definitions 704 may be received from an authoring tool, such as a tool that provides an IDE for linking assets to the framework, through accessing a configuration file, or according to various other techniques.

At action 706, one or more templates are configured to map the defined assets to elements of the logical data model using the schema. Configuration of templates in this manner may occur based on the particular defined data lenses. As data lenses are defined, templates are configured to access the intermediate data for particular data types (e.g., tags) relevant to those lenses. Extractors identify the type of data they are providing through the use of such tags, and the templates ingest that data to bind the data between the extractor and the associated data lens.

At action 708, the process 700 initiates mapping between the intermediate data and the logical data model using the configured template. This may include, for example, causing execution of an application or microservice to perform the mapping, causing that application or microservice to begin listening for the presence of data to map the data to the logical data model, and/or otherwise processing intermediate data to generate or populate the logical data model. As extractors feed data from the assets into the intermediate datastore, the extractors facilitate the process of tagging that data with particular identifiers. The templates identify data to populate the logical model based on the tags associated with that data in the intermediate datastore. In this manner, the templates facilitate construction of the datastore using the tagged data retrieved by the extractors.

Figure 8:
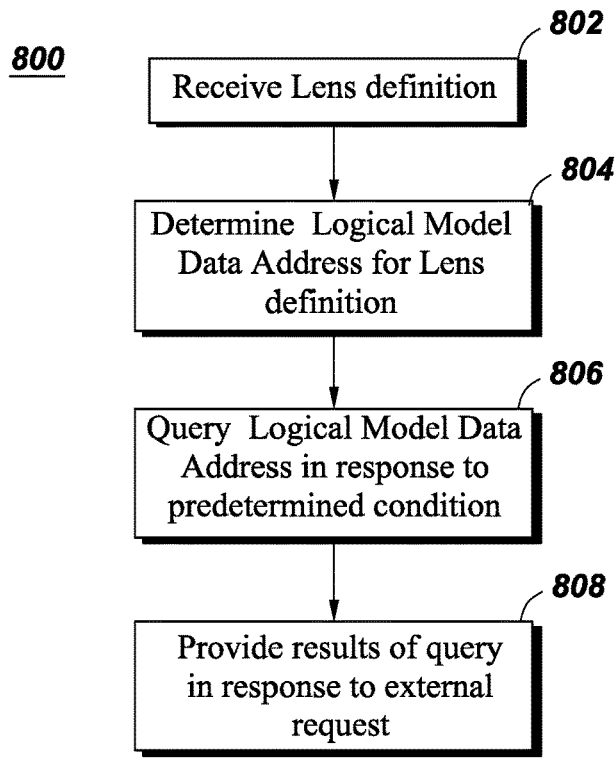
FIG. 8 depicts an example of a data lens access process in accordance with some embodiments.

FIG. 8 illustrates an example of a process 800 for providing data to one or more endpoints from a logical model by a data lens layer in accordance with some embodiments. The process 800 illustrates a mechanism for defining data lenses, using those data lenses to access information in a logical model, and presenting that information in a manner suitable for consumption by one or more external applications or predictive models. The process 800 may be implemented, for example, by a data lens layer as described above with respect to FIGS. 1 and 4, via computing hardware such as described above with respect to FIG. 5.

The process 800 functions to receive a set of lens definitions and to use those lens definitions to access data stored within a logical model. The accessed data is exposed through the data lenses as one or more endpoints, such as Representational State Transfer (REST) API endpoints. External predictive models may query these endpoints to extract the data from the underlying logical model, while being loosely coupled to that logical model and the underlying intermediate data used to construct that model through a template mapping process as described above with respect to FIGS. 1 and 3.

At action 802, the process 800 begins with the receipt of one or more data lens definitions. As described above, the data lens definitions may be provided as part of a data model schema. The data lens definitions may specify the particular attributes of the data lens, including the manner in which the data lens may be queried, the type of data accessed by the lens, and the like. At action 804, the received data lens definitions may be used to determine the relevant data stored within the logical model. For example, in some embodiments the data lens definitions merely recite a schema for the lens, rather than a particular link to a particular asset. The process 800 may dynamically determine which components of the logical model are related to the data lens (e.g., which assets have an asset type associated with the lens), and create an appropriate endpoint for each set of data within the logical model that matches the criteria associated with the lens. To this end, the process 800 may query the logical model to identify the appropriate assets that provide the data associated with the lens. In some embodiments, the process 800 may define a lens for each asset that meets those criteria. A given data lens definition may define a particular endpoint associated with all assets of a given type. That endpoint may be configured to allow specification of query attributes by the querying application, such that a lens associated with assets of a given type may receive a particular model number or serial number as part of a query request.

At action 806, the logical data model is queried for the data associated with the data lens(es) in response to a particular predetermined condition. The predetermined condition may be any particular condition for controlling the access of the logical model. For example, the predetermined condition may be a timer, such that the logical model is queried at particular intervals, or the predetermined condition may be in response to an event indicating that the associated data in the logical model as changed. As yet another example, the predetermined condition may be in response to an external application or predictive model accessing an endpoint associated with the lens.

Performing the query may also include processing the received data. For example, in some embodiments a data lens may include additional instructions for converting, formatting, or executing a function on data retrieved by the query. As an example, a given data lens may include averaging a value across multiple assets, and returning that average via an endpoint. As another example, a given data lens may cause fusion of data from different sources (e.g., a usage statistic measured by an asset sensor and an ambient temperature recorded by a local weather service) to provide additional context to sensor data.

The query may also be limited or constrained based on certain query attributes. For example, an external application may request data pertaining to a particular asset model or asset serial number from a data lens associated with a particular asset type.

At action 808, the results of the query are provided via an endpoint of the data lens to an external process, application, or predictive model. In this manner, embodiments facilitate the provision of data to external sources while providing a flexible, loosely coupled environment that facilitates exporting and reuse of the various data lens and extractor definitions.

Although specific hardware and data configurations have been described herein, note that any number of other configurations may be provided in accordance with embodiments of the present invention (e.g., some of the information associated with the databases described herein may be combined or stored in external systems). For example, although some embodiments described herein relate to assets employed in an industrial context, any of the embodiments described herein could be applied to other types of systems and assets.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A computer system implementing a data access framework for providing data to one or more predictive models, the system configured to:

receive at least one asset definition comprising an asset identifier for at least one asset associated with at least one data source, the at least one asset being a physical system having one or more sensors coupled to underlying hardware of the at least one asset;

receive at least one data lens definition defining a data lens, each data lens associated with a particular per asset digital twin of the at least one asset, wherein the per asset digital twin comprises a mathematical representation and a set of tuned parameters that describe the current state of each asset, the at least one data lens definition comprising a data lens identifier and a logical model identifier, the logical model identifier identifying at least one portion of a logical system model that represents the underlying hardware for the at least one asset;

the data lens including applications and data structures defining in hierarchical terms a set of data for an external application, and a relationship between the set of data and an underlying data set, the data lens eliminating a need to identify data storage locations in a first datastore by being agnostic to an underlying storage location of the data;

access the first datastore to retrieve asset information extracted from the at least one asset, the asset information representing data from the one or more sensors;

determine, using the logical model identifier, a portion of the logical system model associated with the retrieved asset information;

format the retrieved asset information for storage in a second datastore corresponding to the logical system model; and enable access to the formatted retrieved asset information via the second datastore.

2. The computer system of claim 1, wherein the at least one asset definition further comprises an asset type, wherein the at least one data lens definition is a plurality of data lens definitions, and wherein one of the plurality of data lens definitions is selected for association with the at least one asset definition based at least in part on the asset type.

3. The computer system of claim 1, wherein the asset definition further comprises at least one address within the first datastore indicating the location of the asset information extracted from the at least one asset.

4. The computer system of claim 1, further configured to initialize an extractor in response to receiving the at least one asset definition, wherein the extractor is configured to communicate with the asset to extract data from the at least one data source and store the extracted data in the first datastore.

5. The computer system of claim 4, wherein the extractor is selected from a plurality of extractors based on the at least one asset definition.

6. The computer system of claim 1, further configured to initialize a data lens in response to receiving the at least one data lens definition, wherein the data lens provides an endpoint for accessing a portion of the logical system model corresponding to the logical model identifier.

7. The computer system of claim 6, wherein the data lens provides access to only the portion of the logical system model corresponding to the logical model identifier.

8. The computer system of claim 6, wherein the data lens definition further comprises at least one access permission, and wherein access to the portion of the logical system model provided by the data lens is limited based on the at least one access permission.

9. The computer system of claim 6, wherein the initialized data lens provides access to the portion of the logical system model to one or more predictive models.

10. The computer system of claim 1, wherein enabling access to the formatted retrieved asset information comprises caching the formatted retrieved asset information in a graph database queryable by a data lens associated with the data lens definition.

11. The computer system of claim 1, wherein enabling access to the formatted retrieved asset information comprises enabling a pass-through of the second datastore to the retrieved asset information stored in the first datastore in response to receiving a query at a data lens associated with the data lens definition.

12. A method for implementing a data access framework to providing data to one or more predictive models, the method comprising:

receiving at least one asset definition comprising an asset identifier for at least one asset associated with at least one data source, the at least one asset being a physical system having one or more sensors coupled to underlying hardware of the at least one asset;

receiving at least one data lens definition defining a data lens, each data lens associated with a particular per asset digital twin of the at least one asset, wherein the per asset digital twin comprises a mathematical representation and a set of tuned parameters that describe the current state of each asset, the at least one data lens definition comprising a data lens identifier and a logical model identifier, the logical model identifier identifying at least one portion of a logical system model that represents the underlying hardware for the at least one asset;

the data lens including applications and data structures defining in hierarchical terms a set of data for an external application, and a relationship between the set of data and an underlying data set, the data lens eliminating a need to identify data storage locations in a first datastore by being agnostic to an underlying storage location of the data;

accessing the first datastore to retrieve asset information extracted from the at least one asset, the asset information representing data from the one or more sensors;

determining, using the logical model identifier, a portion of the logical system model associated with the retrieved asset information; formatting the retrieved asset information for storage in a second datastore corresponding to the logical system model; and enabling access to the formatted retrieved asset information via the second datastore.

13. The method of claim 12, wherein the at least one asset definition further comprises an asset type, wherein the at least one data lens definition is a plurality of data lens definitions, and wherein one of the plurality of data lens definitions is selected for association with the at least one asset definition based at least in part on the asset type.

14. The method of claim 12, wherein the asset definition further comprises at least one address within the first datastore indicating the location of the asset information extracted from the at least one asset.

15. The method of claim 12, further comprising initializing an extractor in response to receiving the at least one asset definition, wherein the extractor is configured to communicate with the asset to extract data from the at least one data source and store the extracted data in the first datastore.

16. The method of claim 15, wherein the extractor is selected from a plurality of extractors based on the at least one asset definition.

17. The method of claim 12, further comprising initializing a data lens in response to receiving the at least one data lens definition, wherein the data lens provides an endpoint for accessing a portion of the logical system model corresponding to the logical model identifier.

18. The method of claim 17, wherein the data lens provides access to only the portion of the logical system model corresponding to the logical model identifier.

19. The method of claim 17, wherein the data lens definition further comprises at least one access permission, and wherein access to the portion of the logical system model provided by the data lens is limited based on the at least one access permission.

20. A non-transitory computer readable storage medium comprising instructions that, when executed by a processor, configure the processor to:

receive at least one asset definition comprising an asset identifier for at least one asset associated with at least one data source, the at least one asset being a physical system having one or more sensors coupled to underlying hardware of the at least one asset;

receive at least one data lens definition defining a data lens, each data lens associated with a particular per asset digital twin of the at least one asset, wherein the per asset digital twin comprises a mathematical representation and a set of tuned parameters that describe the current state of each asset, the at least one data lens definition comprising a data lens identifier and a logical model identifier, the logical model identifier identifying at least one portion of a logical system model that represents the underlying hardware for the at least one asset;

the data lens including applications and data structures defining in hierarchical terms a set of data for an external application, and a relationship between the set of data and an underlying data set, the data lens eliminating a need to identify data storage locations in a first datastore by being agnostic to an underlying storage location of the data;

access the first datastore to retrieve asset information extracted from the at least one asset, the asset information representing data from the one or more sensors;

determine, using the logical model identifier, a portion of the logical system model associated with the retrieved asset information;

format the retrieved asset information for storage in a second datastore corresponding to the logical system model; and enable access to the formatted retrieved asset information via the second datastore.

* * * * *